(12) United States Patent
Toya

(10) Patent No.: US 7,823,712 B2
(45) Date of Patent: Nov. 2, 2010

(54) WET-TYPE MULTI-PLATE CLUTCH

(75) Inventor: Ritsuo Toya, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 684 days.

(21) Appl. No.: 11/704,957

(22) Filed: Feb. 12, 2007

(65) Prior Publication Data
US 2007/0187206 A1 Aug. 16, 2007

(30) Foreign Application Priority Data
Feb. 15, 2006 (JP) ................. 2006-37922

(51) Int. Cl.
F16D 13/52 (2006.01)
F16D 13/64 (2006.01)
(52) U.S. Cl. ................. 192/70.14; 192/107 R
(58) Field of Classification Search ........... 192/70.14
See application file for complete search history.

(56) References Cited

U.S. PATENT DOCUMENTS

| | | | |
|---|---|---|---|
| 6,062,367 A | 5/2000 | Hirayanagi et al. | 192/107 R |
| 6,397,997 B2 * | 6/2002 | Kato | 192/70.14 |
| 6,702,088 B2 | 3/2004 | Kitaori et al. | |
| 2004/0069586 A1 | 4/2004 | Sasse | |
| 2004/0121145 A1 | 6/2004 | Kawabata et al. | |
| 2007/0151822 A1 * | 7/2007 | Toya et al. | 192/70.14 |
| 2007/0246321 A1 * | 10/2007 | Toya | 192/70.14 |
| 2007/0251795 A1 * | 11/2007 | Toya | 192/70.12 |

FOREIGN PATENT DOCUMENTS

| | | |
|---|---|---|
| JP | 63-297832 | 12/1988 |
| JP | 11-141570 | 5/1999 |

* cited by examiner

*Primary Examiner*—Richard M. Lorence
(74) *Attorney, Agent, or Firm*—Miles & Stockbridge P.C.

(57) ABSTRACT

In a wet-type multi-plate clutch comprising an externally-toothed plate and an internally-toothed plate each of which is formed by adhering a friction material on a core plate and in which torque is transmitted by engaging the externally-toothed plate and the internally-toothed plate, the friction materials are adhered on opposed surfaces of the externally-toothed plate and the internally-toothed plate which are opposed to each other.

6 Claims, 3 Drawing Sheets

WET-TYPE MULTI-PLATE CLUTCH

BACKGROUND OF THE INVENTION

1. Field of the Invention

The present invention relates to a wet-type multi-plate clutch used in a clutch and/or a brake of an automatic transmission (AT) of a vehicle. More particularly, the present invention relates to an improvement in friction surfaces of an internally- toothed plate and an externally-toothed plate.

2. Description of the Related Art

In the past, wet-type multi-plate clutches were provided with separator plates as externally-toothed plates and friction plates as internally-toothed plates obtained by adhering friction materials on core plates and were designed to transmit torque by engaging the externally-toothed plates with the internally-toothed plates.

Further, most of friction heat generated by these plates upon engagement of the clutch is transferred to the externally-toothed plates or the internally-toothed plates to which the friction materials are not adhered to be dispersed, since the friction material has a predetermined adiabatic property.

In the past, a wet-type multi-plate clutch comprising friction plates as internally-toothed plates on both surfaces of which friction materials are adhered, as shown in FIG. 1 of Japanese Patent Application Laid-open No. 11-141570 (1999), has been known. Further, a plate arrangement of one-surface alternately adhering type in which the friction materials are adhered on surfaces of the internally-toothed plates and the externally-toothed plates which are not opposed to each other, respectively, is also known.

Although a plate thickness of the externally-toothed plate can be increased to increase a dispersed heat amount in order to enhance the adiabatic property, if the plate thickness is increased, an axial length of the plate is also increased, thereby arising a new problem that the clutch cannot be designed to have a compact size. To avoid this, there has been proposed a clutch of one-surface alternately adhering type in which the friction materials are adhered alternately on one-surfaces of the externally-toothed plates and the internally-toothed plates so as to disperse the friction heat from both of the externally-toothed plates and the internally-toothed plates.

However, in the clutch comprising the plates of one-surface alternately adhering type, since the friction heat is generated only on the single surface of each plate, unbalance of heat is caused between both surfaces of each plate to deform the plate. Consequently, a bad influence will be affected upon the endurance and the friction property of the friction material. Further, during an idle rotation of the clutch, since axial loads are imbalanced between front and rear surfaces of the plate, there arises a problem that it is difficult to maintain a clearance between the internally-toothed plate and the externally-toothed plate constant, thereby increasing idle rotation drag torque.

SUMMARY OF THE INVENTION

Accordingly, an object of the present invention is to provide a wet-type multi-plate clutch in which unbalance of heat on each plate can be suppressed by absorbing friction heat by means of both surfaces of each externally-toothed plate and each internally-toothed plate, and, in an idle rotation of the clutch, separation between the externally-toothed plate and the internally-toothed plate is improved.

To achieve the above object, the present invention provides a wet-type multi-plate clutch comprising an externally-toothed plate and an internally-toothed plate each of which is formed by adhering a friction material onto a core plate and in which torque is transmitted by engaging the externally-toothed plate with the internally-toothed plate and wherein the friction materials are adhered on opposed surfaces of the externally-toothed plate and the internally-toothed plate which are opposed to each other.

According to the wet-type multi-plate clutch as mentioned above, the following advantages can be obtained.

Since the friction materials are adhered on both surfaces of the externally-toothed plate and of the internally-toothed plate, friction heat can be absorbed at the both surfaces of the plates to reduce the unbalance of heat on each plate, and further, during an idle rotation of the clutch, separation between the externally-toothed plate and the internally-toothed plate can be improved.

By setting a thickness of the internally-toothed plate to become greater than a thickness of the externally-toothed plate, heat dispersing properties of the externally-toothed plate and the internally-toothed plate can be made more uniform, thereby enhancing the heat resisting ability. The reason is that the externally-toothed plate is engaged with an element such as a clutch drum or a transmission case, having a heat capacity greater than that of a clutch hub with which the internally-toothed plate is engaged.

Further, by increasing a thickness of each tooth of the internally-toothed plate, face pressure between teeth at a fitting region between the internally-toothed plate and the hub can be reduced. The reason is that, generally, in comparison with a fitting region of the externally-toothed plate, the fitting region of the internally-toothed plate having a smaller spline diameter tends to increase the face pressure between the teeth.

Similarly, since a surface area of the friction surface of the friction material of the internally-toothed plate can be increased more than a corresponding surface area of the externally-toothed plate, heat loads applied to the externally-toothed plate and the internally-toothed plate can be made more uniform, thereby enhancing the adiabatic property. In this case, the surface area of the friction material of the internally-toothed plate can be increased and the thickness of the externally-toothed plate can be increased, thereby making heat absorbing amounts of the internally-toothed plate and the externally-toothed plate more uniform.

Furthermore, by designing so that the friction materials are adhered asymmetrically on the front and rear surfaces of the externally-toothed plate and the internally-toothed plate, heat generating positions are differentiated between the front and rear surfaces in a radial direction, with the result that heat load to the friction material can be reduced.

The word "internally-toothed plate" used herein means a plate provided at its inner diameter side with spline teeth and mounted, for a sliding movement in an axial direction, on a hub of a wet-type multi-plate clutch at an inner diameter side thereof; whereas the word "externally-toothed plate" means a plate provided at its outer diameter side with spline teeth and mounted, for a sliding movement in an axial direction, on and spline-engaged with a clutch case of the wet-type multi-plate clutch at an inner diameter side thereof. These plates may functionally differ from a "separator plate" and a "friction plate" which are used in a general sense.

Further features of the present invention will become apparent from the following description of exemplary embodiments with reference to the attached drawings.

DESCRIPTION OF THE EMBODIMENTS

Figure 1:
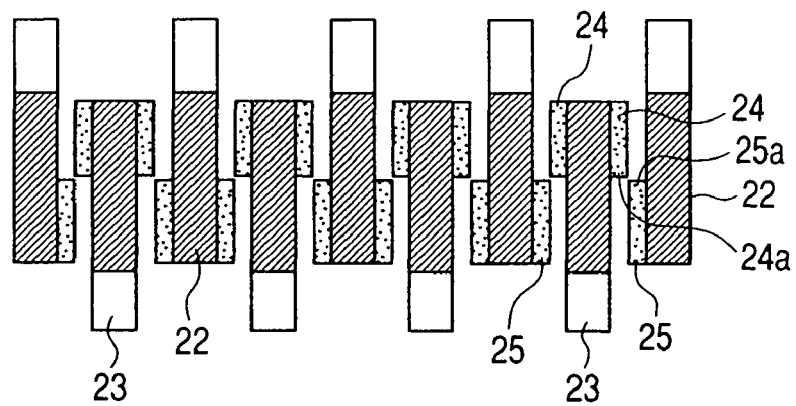
FIG. 1 is a sectional view showing externally-toothed plates and internally-toothed plates according to a first embodiment of the present invention in detail.

Now, various embodiments of the present invention will be fully explained with reference to the accompanying drawings. Incidentally, in the drawings, the same elements or part will be designated by the same reference numerals.

Figure 6:
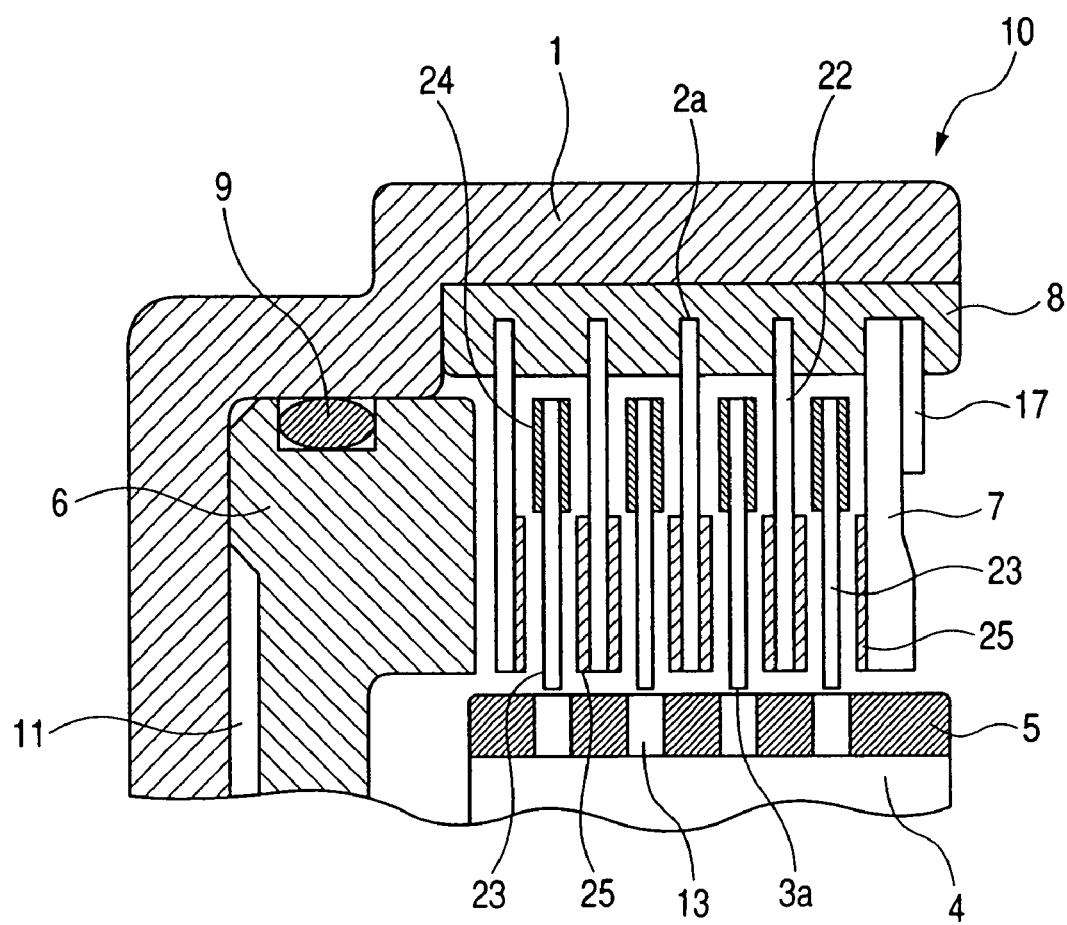
FIG. 6 is an axial partial sectional view for explaining a fundamental arrangement of a wet-type multi-plate clutch to which various embodiments of the present invention can be applied.

FIG. 6 is an axial partial sectional view for explaining a fundamental arrangement of a wet-type multi-plate clutch to which various embodiments of the present invention can be applied. Incidentally, internally-toothed plates and externally-toothed plates according to a first embodiment of the present invention are mounted to the clutch.

The wet-type multi-plate clutch 10 comprises a substantially cylindrical drum or clutch case 1 having an axial open one end, a hub 4 arranged within the interior of the clutch case 1 and rotated coaxially relative to the clutch case, a plurality of annular externally-toothed plates 22 mounted to an inner periphery of the clutch case 1 via splines 8 for a sliding movement in an axial direction, and a plurality of annular internally-toothed plates 23 mounted to an outer periphery of the hub 4 via splines 5 and alternately arranged with the externally-toothed plates 22 in the axial direction; friction materials are adhered on the internally-toothed plates.

The wet-type multi-plate clutch 10 further includes a piston 6 for urging and engaging the externally-toothed plates 22 and the internally-toothed plates 23, a backing plate 7 provided on the inner periphery of the clutch case 1 and adapted to hold the externally-toothed plates 22 and the internally-toothed plates 23 in a fixed condition at an axial one end of the clutch, and a stop ring 17 for holding the backing plate.

As shown in FIG. 6, the piston 6 is mounted within a closed end portion of the clutch case 1 for a sliding movement in the axial direction. An O-ring 9 is disposed between an outer peripheral surface of the piston 6 and an inner surface of the clutch case 1. Further, a seal member (not shown) is also interposed between an inner peripheral surface of the piston 6 and an outer peripheral surface of a cylindrical portion (not shown) of the clutch case 1. Accordingly, an oil-tight hydraulic chamber 11 is defined between an inner surface of the closed end portion of the clutch case 1 and the piston 6.

On both surfaces of the internally-toothed plate 23 held by the hub 4 for axial sliding movement, friction materials 25 having a predetermined coefficient of friction are secured. Further, friction materials 24 are secured to both surfaces of the externally-toothed plate 22. Further, lubricating oil supplying ports 13 extending in a radial direction are formed in the hub 4 to flow lubricating oil from the inner diameter side to the outer diameter side of the wet-type multi-plate clutch 10.

In the wet-type multi-plate clutch 10 having the above-mentioned construction, the clutch is engaged (tightened) and disengaged (released) in the following manner. FIG. 6 shows a clutch released condition in which the externally-toothed plates 22 are separated from the internally-toothed plates 23. In this released condition, by a biasing force of a return spring (not shown), piston 6 abuts against the inner surface of the closed end portion of the clutch case 1.

From this condition, to engage or tighten the clutch, hydraulic pressure is supplied into the hydraulic chamber 11 defined between the piston 6 and the clutch case 1. As the hydraulic pressure is increased, the piston 6 is shifted to the right in FIG. 6 in opposition to the biasing force of the return spring (not shown), thereby firmly contacting the externally-toothed plates 22 with the internally-toothed plates 23. In this way, the clutch is engaged.

After the engagement, to disengage the clutch again, the hydraulic pressure is released from the hydraulic chamber 11. When the hydraulic pressure is released, the piston 6 is shifted by the biasing force of the return spring (not shown) until it abuts against the inner surface of the closed end portion of the clutch case 1. In this way, the clutch is released or disengaged.

First Embodiment

FIG. 1 is a sectional view showing externally-toothed plates 22 and internally-toothed plates 23 of a wet-type multi-plate clutch according to a first embodiment of the present invention in detail. Plural externally-toothed plates 22 are arranged at a predetermined pitch along the axial direction, and friction materials 25 are adhered on both surfaces of each externally-toothed plate via an adhesive or the like at innermost diameter side thereof. In each of various embodiments shown in FIGS. 1 to 5, a clutch released condition is shown. That is to say, in this condition, the internally-toothed plates are not engaged with the externally-toothed plates.

Further, plural internally-toothed plates 23 are arranged at a predetermined pitch along the axial direction, and friction materials 24 are adhered on both surfaces of each externally-toothed plate via an adhesive or the like at outermost diameter side thereof. As shown, the externally-toothed plates 22 and the internally-toothed plates 23 have substantially the same axial thickness and are arranged alternately along the axial direction.

As can be seen from FIG. 1, with respect to each of two outermost axial plates among the plural externally-toothed plates 22, the friction material 25 is adhered on only one surface of the plate which is opposed to the internally-toothed plate 23. Further, with respect to other (intermediate) externally-toothed plates 22, the friction materials 25 are adhered on both axial surfaces of each plate. The reason is that both surfaces of the intermediate externally-toothed plates 22 are opposed to the internally-toothed plates 23.

To the contrary, the friction materials 24 are provided on both surfaces of all of the internally-toothed plates 23. Thus, the friction materials 24 are adhered all surfaces of the internally-toothed plates 22 opposed to the externally-toothed plates 22 including the outermost externally-toothed plates 22.

An inner diameter side edge 24a of each friction material 24 provided on the internally-toothed plate 23 is arranged not to interfere with an outer diameter side edge 25a of each friction material 25 provided on the externally-toothed plate. That is to say, a predetermined clearance is formed between the edge 24a and the edge 25a along a radial direction. Accordingly, the friction materials 24 do not interfere with the friction materials 25 upon engagement of the clutch.

Further, a radial width of the friction material 24 is slightly smaller than that of the friction material 25. Thus, a friction surface area slidingly contacting with the friction material in the internally-toothed plate is greater than that in the externally-toothed plate.

Second Embodiment

Figure 2:
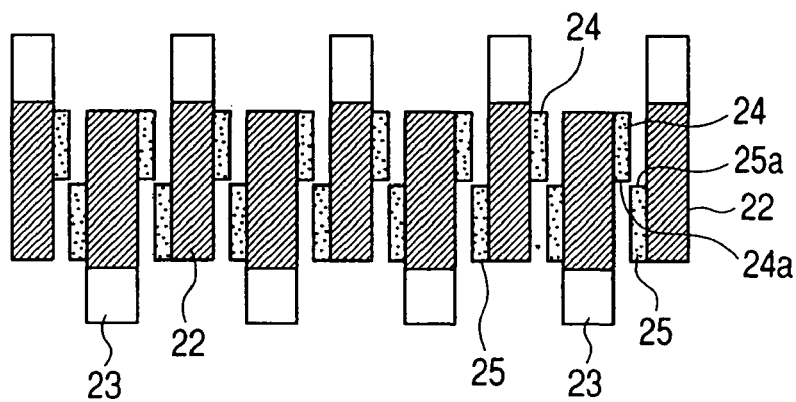
FIG. 2 is a sectional view showing externally-toothed plates and internally-toothed plates according to a second embodiment of the present invention in detail.

FIG. 2 is a sectional view showing externally-toothed plates 22 and internally-toothed plates 23 according to a second embodiment of a wet-type multi-plate clutch of the present invention in detail. The fundamental construction of the second embodiment is similar to that of the first embodiment.

In the second embodiment, the friction materials 24 are adhered on only one-surfaces of the externally-toothed plates 22 directed toward the same direction, and the friction materials 25 are adhered on only one-surfaces of the internally-toothed plates 23 directed toward the same direction. As can be seen from FIG. 2, the arrangement is of one-surface alternately adhering type in which the friction material 24 and the friction material 25 are provided on the opposed surfaces, respectively. The externally-toothed plates 22 and the internally-toothed plates 23 are arranged alternately along the axial direction.

Similar to the first embodiment, the inner diameter side edge 24a of the friction material 24 provided on the internally-toothed plate 23 is arranged not to interfere with the outer diameter side edge 25a of the friction material 25. That is to say, a predetermined clearance is formed between the edge 24a and the edge 25a along the radial direction. Accordingly, the friction materials 24 do not interfere with the friction materials 25 upon engagement of the clutch.

Further, a radial width of the friction material 24 is slightly smaller than that of the friction material 25. Thus, a friction surface area slidingly contacting with the friction material in the internally-toothed plate is greater than that in the externally-toothed plate. In order to suppress unbalance of heat due to such difference between the friction surfaces areas, as shown, an axial thickness of the internally-toothed plate 23 is set to be greater than an axial thickness of the externally-toothed plate 22. Further, the friction materials are adhered asymmetrically on the front and rear surfaces of each of the externally-toothed plate 22 and the internally-toothed plate 23, with the result that heat generating positions are differentiated between the front and rear surfaces of each plate, thereby reducing heat load to the friction material.

Third Embodiment

Figure 3:
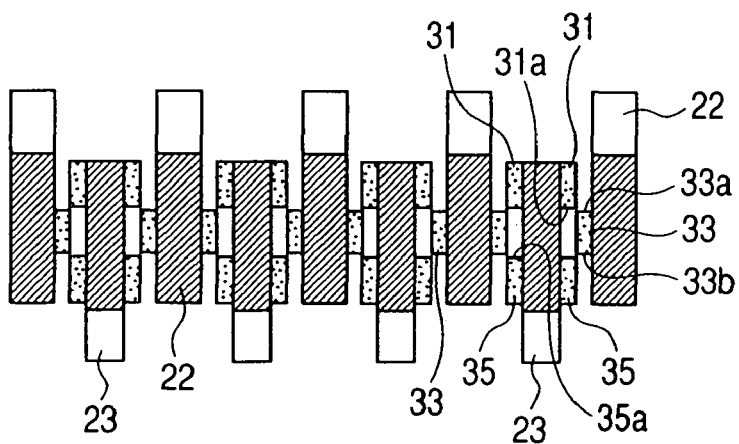
FIG. 3 is a sectional view showing externally-toothed plates and internally-toothed plates according to a third embodiment of the present invention in detail.

FIG. 3 is a sectional view showing externally-toothed plates 22 and internally-toothed plates 23 according to a third embodiment of a wet-type multi-plate clutch of the present invention in detail. The fundamental construction of the third embodiment is similar to that of the first embodiment.

In the third embodiment, a method for adhering friction materials differs from those in the first and second embodiment. A pair of friction materials 31 and 35 are adhered both axial surfaces of the internally-toothed plate 23 which are opposed to the externally-toothed plates 22. Further, a friction material 33 is adhered only on one axial surface of each of two externally-toothed plates 22 which are disposed at outermost axial ends, and, with respect to other externally-toothed plates 22 disposed between the two outermost externally-toothed plates, friction materials 33 are adhered on both axial surfaces of each plate.

The friction material 31 is adhered on the internally-toothed plate 23 at an outermost diameter side thereof and the friction material 35 is adhered at an innermost diameter side of the internally-toothed plate. A predetermined radial gap is formed between the friction material 31 and the friction material 35.

The friction material 33 adhered to the externally-toothed plate 22 is arranged at a middle area in the radial direction and is positioned so that it is fitted into the gap defined between the friction material 31 and the friction material 35 adhered on the internally-toothed plate 23. Predetermined clearances are formed between an inner diameter side edge 31a of the friction material 31 and an outer diameter side edge 33a of the friction material 33 and between an outer diameter side edge 35a of the friction material 35 and an inner diameter side edge 33b of the friction material 33.

Accordingly, since the friction material 33 is fitted into the gap between the friction material 31 and the friction material 35, these friction materials do not interfere with each other, thereby not obstructing the engagement of the clutch.

Further, a radial width of the friction material 31 is substantially the same as a radial width of the friction material 35; whereas, a radial width of the friction material 33 is smaller than those of the friction materials 31 and 35. Since the friction materials 31 and 35 are adhered on the internally-toothed plate 23, the friction surface area of the externally-toothed plate 22 is greater than the friction surface area of the internally-toothed plate 23 by about two times or more. Thus, the friction surface area of the externally-toothed plate against which the friction material is slidingly contacted is greater than that of the internally-toothed plate. In order to suppress unbalance of heat due to such difference between the friction surfaces areas, as shown, an axial thickness of the externally-toothed plate 23 is set to be greater than an axial thickness of the internally-toothed plate 22.

By increasing the thickness of the externally-toothed plate more than the thickness of the internally-toothed plate in this way, heat dispersing properties of the externally-toothed plate and the internally-toothed plate can be made uniform, thereby enhancing the heat resisting ability. The reason is that the externally-toothed plate is engaged with an element such as a clutch drum or a transmission case, having a heat capacity greater than that of a clutch hub with which the internally-toothed plate is engaged.

Fourth Embodiment

Figure 4:
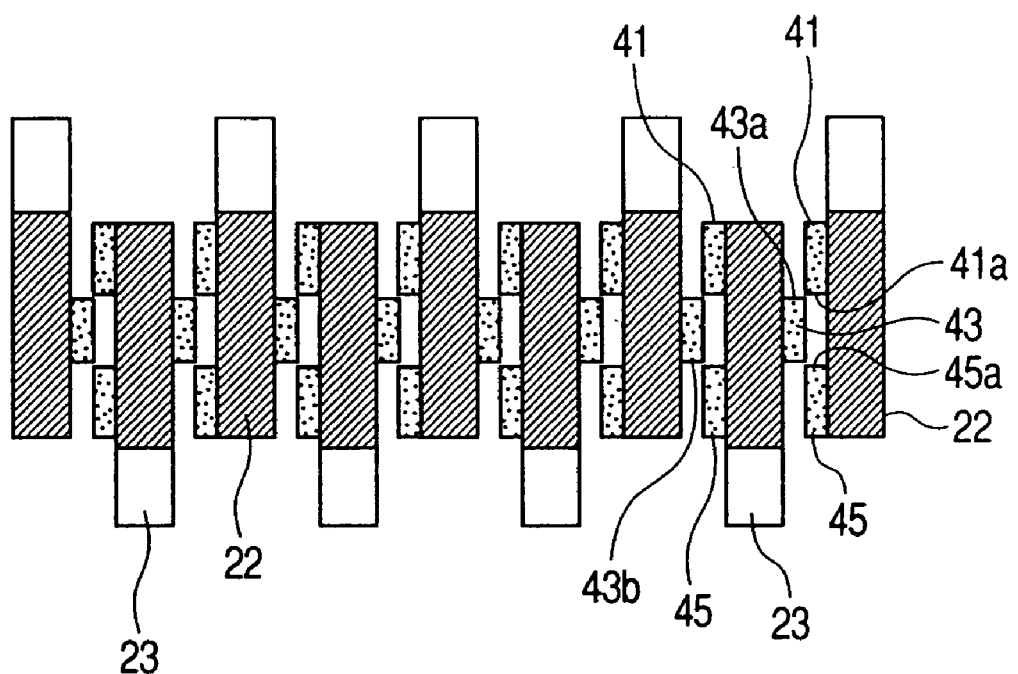
FIG. 4 is a sectional view showing externally-toothed plates and internally-toothed plates according to a fourth embodiment of the present invention in detail.

FIG. 4 is a sectional view showing externally-toothed plates 22 and internally-toothed plates 23 according to a fourth embodiment of a wet-type multi-plate clutch of the present invention in detail. The fundamental construction of the fourth embodiment is similar to that of the first embodiment.

In the fourth embodiment, friction materials 41 and 45 are adhered on an axial one surface of each of the internally-toothed plates 23. Further, a friction material 43 is adhered on the other axial surface of each internally-toothed plate. Further, a pair of friction materials 41 and 45 is adhered on an axial one surface of each of the externally-toothed plates 23, and a friction material 43 is adhered on the other axial surface of each externally-toothed plate.

The friction materials 41 are adhered on the externally-toothed plate 22 and the internally-toothed plate 23 at their outermost diameter sides, whereas, the friction materials 45 are adhered at their innermost diameter sides. A predetermined radial gap is formed between the friction material 41 and the friction material 45. Further, the friction materials 43 are adhered on the externally-toothed plate 22 and the internally-toothed plate 23 at their substantially middle areas thereof in the radial direction.

As shown in FIG. 4, the pair of friction materials 41 and 45 is adhered on one surface of one of two externally-toothed plates 22 disposed at endmost positions in the axial direction, and the friction material 43 is adhered on one surface of the other externally-toothed plate 22. Intermediate externally-toothed plates 22 disposed between the endmost externally-toothed plates have the same constructions, and, regarding these intermediate plates, the pair of friction materials 41 and 45 is adhered on one surface of each plate and the friction material 43 is adhered on the other surface of each plate.

Between the friction materials 41 and 45 adhered at plural positions in the radial direction, a gap is defined, into which the friction material 43 adhered at the intermediate position can be fitted. Accordingly, upon the engagement of the clutch, as the internally-toothed plate 23 and the externally-toothed plate 22 approach each other, the friction material 43 is fitted into the gap between the friction material 41 and the friction material 45.

Predetermined clearances are formed between an inner diameter side edge 41a of the friction material 41 and an outer diameter side edge 43a of the friction material 43 and between an outer diameter side edge 45a of the friction material 45 and an inner diameter side edge 43b of the friction material 43, so that the friction material 43 can be fitted between the friction material 41 and the friction material 45 adhered on the externally-toothed plate 22 and the internally-toothed plate 23.

Accordingly, if the friction material 41, friction material 45 and friction material 43 are shifted in the axial direction, since these friction materials do not interfere with each other, the engagement of the clutch is not obstructed.

Further, the friction material 41 and the friction material 45 have substantially the same radial widths; but, the friction material 43 has a radial width smaller than those of the friction materials 41 and 45. However, since the friction materials 41 and 45 are adhered on the externally-toothed plate 22 and the internally-toothed plate 23 and the friction materials 43 are adhered on the externally-toothed plate 22 and the internally-toothed plate 23, upon the engagement of the clutch, the friction surface area of the externally-toothed plate 22 is substantially the same as that of the internally-toothed plate 23. Thus, since it is not necessary to suppress the unbalance of heat due to the difference between friction surface areas, as shown, an axial thickness of the internally-toothed plate 23 can be substantially the same as that of the externally-toothed plate 22. Further, since the friction materials are adhered asymmetrically on the front and rear surfaces of the externally-toothed plate 22 and the internally-toothed plate 23, the heat generating positions are differentiated between the front and rear surfaces, thereby reducing the heat load to the friction material.

Fifth Embodiment

Figure 5:
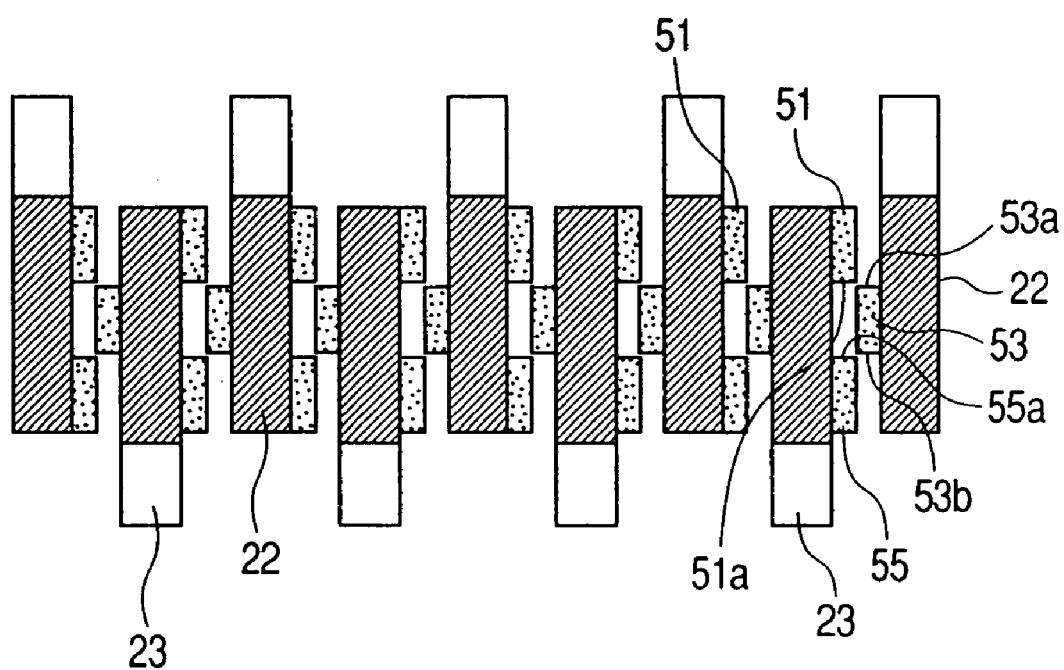
FIG. 5 is a sectional view showing externally-toothed plates and internally-toothed plates according to a fifth embodiment of the present invention in detail.

FIG. 5 is a sectional view showing externally-toothed plates 22 and internally-toothed plates 23 according to a fourth embodiment of a wet-type multi-plate clutch of the present invention in detail. The fundamental construction of the fifth embodiment is similar to that of the fourth embodiment.

In the fifth embodiment, friction materials 51 and 55 are adhered on an axial one surface of each internally-toothed plate 23. Further, a friction material 53 is adhered on the other axial surface of each plate. Further, a pair of friction materials 51 and 55 is adhered on an axial one surface of each externally-toothed plate 22, and a, friction material 53 is adhered on the other axial surface of the plate.

The friction materials 51 are adhered on the externally-toothed plate 22 and the internally-toothed plate 23 at their outermost diameter sides, whereas, the friction materials 55 are adhered at their innermost diameter sides. A predetermined radial gap is formed between the friction material 51 and the friction material 55. Further, the friction materials 43 are adhered on the externally-toothed plate 22 and the internally-toothed plate 23 at their substantially middle areas thereof in the radial direction.

As shown in FIG. 5, the pair of friction materials 51 and 55 is adhered on one surface of one of two externally-toothed plates 22 disposed at endmost positions in the axial direction, and the friction material 53 is adhered on one surface of the other externally-toothed plate 22. Intermediate externally-toothed plates 22 disposed between the endmost externally-toothed plates have the same constructions, and, regarding these intermediate plates, the pair of friction materials 51 and 55 is adhered on one surface of each plate and the friction material 53 is adhered on the other surface of each plate.

Between the friction materials 51 and 55 adhered at plural positions in the radial direction, a gap is defined, into which the friction material 53 adhered at the intermediate position can be fitted. Accordingly, upon the engagement of the clutch, as the internally-toothed plate 23 and the externally-toothed plate 22 approach each other, the friction material 53 is fitted into the gap between the friction material 51 and the friction material 55.

Predetermined clearances are formed between an inner diameter side edge 51a of the friction material 51 and an outer diameter side edge. 53a of the friction material 53 and between an outer diameter side edge 55a of the friction material 55 and an inner diameter side edge 53b of the friction material 53, so that the friction material 53 can be fitted between the friction material 51 and the friction material 55 adhered on the externally-toothed plate 22 and the internally-toothed plate 23.

Accordingly, if, the friction material 51, friction material 55 and friction material 53 are shifted in the axial direction, since these friction materials do not interfere with each other, the engagement of the clutch is not obstructed.

Further, the friction material 51 and the friction material 55 have substantially the same radial widths; but, the friction material 53 has a radial width smaller than those of the friction materials 51 and 55. However, since the friction materials 51 and 55 are adhered on one surfaces of the externally-toothed plate 22 and the internally-toothed plate 23 and the friction materials 53 are adhered on the other the surfaces of externally-toothed plate 22 and the internally-toothed plate 23, upon the engagement of the clutch, the friction surface area of the externally-toothed plate 22 is substantially the same as that of the internally-toothed plate 23.

Since the externally-toothed plate is engaged with an element such as a clutch drum or a transmission case, having a heat capacity greater than that of a clutch hub with which the internally-toothed plate is engaged, by increasing the thickness of the internally-toothed plate more than the thickness of the externally-toothed plate, heat dispersing properties of the externally-toothed plate and the internally-toothed plate can be made uniform, thereby enhancing the heat resisting ability.

Thus, the friction surface area of the internally-toothed plate against which the friction material is, slidingly contacted becomes greater than that of the externally-toothed plate. In order to suppress the unbalance of heat due to such difference between the friction surface areas, as shown, the axial thickness of the internally-toothed plate 23 is greater than that of the externally-toothed plate 22.

In the above-mentioned embodiments, the friction materials are adhered asymmetrically on the front and rear surfaces of the core plates of the internally-toothed plate 23 and the externally-toothed plate 22. Further, the axial thicknesses of the core plates are set so that the heat absorbing capacities at the friction surfaces of the externally-toothed plate 22 and the internally-toothed plate 23 are substantially the same as each other.

Further, the friction materials can be adhered on the internally-toothed plate 23 or the externally-toothed plate 22 at plural positions thereof in the radial direction. By adhering the friction material on the opposed surfaces of the externally-toothed plate 22 and the internally-toothed plate 23 and by adhering the friction materials on both surfaces of the externally-toothed plate 22 and the internally-toothed plate 23, the friction heat can be absorbed at both surfaces to reduce the unbalance of heat of the plate, and, during the idle rotation of the clutch, the separation between the externally-toothed plate 22 and the internally-toothed plate 23 can be improved.

The friction material may be formed as a ring-shaped element or may be formed by adhering friction material segments. Further, the friction material may be provided with a lubricating oil passage or an oil groove as a lubricating oil reservoir. When the friction material segment are adhered to form the friction material, regions defined between the friction material segments and exposing the core plate can also be expected to act as oil grooves.

Further, upon the engagement of the wet-type multi-plate clutch, i.e. when both plates are engaged with each other, by setting so that the heat amount generated on the friction surface of the externally-toothed plate becomes equal to the heat amount generated on the friction surface of the internally-toothed plate, the heat dispersing properties of both plates can be made more uniform, thereby enhancing the heat resisting ability.

In the internally-toothed plate and the externally-toothed plate, although the friction material adhered at the outer diameter side and the friction material adhered at the inner diameter side are formed from the same material, these friction materials may be formed from different materials. Further, it should be noted that the number of the friction materials provided at plural positions in the radial direction is not limited to the illustrated number(s), but other numbers of friction materials can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-37922, filed Feb. 15, 2006, which is hereby incorporated by reference herein in its entirety.

What is claimed is:

1. A wet-type multi-plate clutch comprising:
   first and second friction plates, each friction plate having an axial surface including a first surface portion with a friction material thereon and an exposed friction surface portion, which is substantially coplanar with respect to said first surface portion,
   wherein the first and second friction plates are arranged such that the friction material on each of the first and second friction plates is opposed to the exposed friction surface portion of the other of the first and second friction plates for frictional engagement therewith, and
   a radial width of the friction material on one of the first and second friction plates is smaller than a radial width of the friction material on the other of the first and second friction plates.

2. A wet-type multi-plate clutch according to claim 1, wherein the first friction plate is an externally-toothed plate and the second friction plate is an internally-toothed plate.

3. A wet-type multi-plate clutch according to claim 1, wherein the friction material on one of the first and second friction plates includes a plurality of friction material segments at different positions in a radial direction.

4. A wet-type multi-plate clutch according to claim 1, wherein the friction material on the axial surface of one of the first and second friction plates is asymmetrically arranged with respect to friction material on an opposite axial surface of said one of the first and second friction plates.

5. A wet-type multi-plate clutch according to claim 1, wherein axial thicknesses of the externally-toothed plate and the internally-toothed plate differ such that a heat imbalance due to engagement of the friction materials with the corresponding exposed surfaces is suppressed.

6. A wet-type multi-plate clutch according to claim 1, wherein the friction material on each of the first and second frictions plates is comprised of a plurality of friction material segments.

* * * * *